United States Patent
Martin

(10) Patent No.: US 10,454,190 B1
(45) Date of Patent: Oct. 22, 2019

(54) BONDING CLIP FOR METAL ROOFING

(71) Applicant: Hubbell Incorporated, Shelton, CT (US)

(72) Inventor: Evan Ronald Martin, Merrimack, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 22 days.

(21) Appl. No.: 15/428,428

(22) Filed: Feb. 9, 2017

Related U.S. Application Data

(60) Provisional application No. 62/294,107, filed on Feb. 11, 2016, provisional application No. 62/340,769, filed on May 24, 2016.

(51) Int. Cl.
| | |
|---|---|
| *H01R 4/64* | (2006.01) |
| *H01R 4/28* | (2006.01) |
| *H02S 30/00* | (2014.01) |
| *H02S 20/23* | (2014.01) |

(52) U.S. Cl.
CPC ............... *H01R 4/64* (2013.01); *H01R 4/28* (2013.01); *H02S 20/23* (2014.12); *H02S 30/00* (2013.01)

(58) Field of Classification Search
CPC .... H01R 4/64; H01R 4/28; H01R 4/26; H02S 30/00; H02S 20/23; Y10T 24/44017
See application file for complete search history.

(56) References Cited

U.S. PATENT DOCUMENTS

| | | | |
|---|---|---|---|
| 942,693 A | 12/1909 | Wintermute | |
| 3,020,602 A | 2/1962 | Siering | |
| 3,049,042 A | 8/1962 | De Lynn | |
| 3,208,119 A | 9/1965 | Sieckerson | |
| 3,528,050 A | 9/1970 | Hindenburg | |
| 4,087,149 A | 5/1978 | Fischer | |
| 4,406,505 A | 9/1983 | Avramovich | |
| 4,875,876 A | 10/1989 | O'Loughlin | |
| 5,347,691 A | 9/1994 | Terazoe | |
| 5,451,167 A | 9/1995 | Zielinski et al. | |
| 6,106,310 A | 8/2000 | Davis et al. | |
| 6,186,799 B1 | 2/2001 | Mello | |
| 6,234,835 B1 | 5/2001 | Bakker et al. | |
| 8,998,660 B2 * | 4/2015 | Bakos | H01R 4/28 439/878 |
| D806,529 S * | 1/2018 | Olenick | D8/399 |
| 2010/0192334 A1 * | 8/2010 | Reichle | B60M 5/02 24/457 |

* cited by examiner

*Primary Examiner* — Robert Sandy
*Assistant Examiner* — Rowland Do
(74) *Attorney, Agent, or Firm* — Wissing Miller LLP

(57) ABSTRACT

Bonding clips used to electrically bond metal roofing are provided. The bonding clips include an electrically conductive back pad having a plurality of arms extending from the back pad. Each arm has one or more penetrating projections extending into a sheet receiving zone between the arms. The one or more penetrating projections penetrate any coatings on metal sheets the clips are attached to so that the one or more penetrating projections contact the underlying metal.

17 Claims, 24 Drawing Sheets

BONDING CLIP FOR METAL ROOFING

CROSS REFERENCE TO RELATED APPLICATIONS

The present disclosure is based on and claims benefit from U.S. Provisional Application Ser. No. 62/294,107 filed Feb. 11, 2016 entitled "Bonding Clip for Metal Roofing" and from U.S. Provisional Application Ser. No. 62/340,769 filed May 24, 2016 entitled "Bonding Clip for Metal Roofing" the entire contents of both applications are herein incorporated by reference.

BACKGROUND

Field

The present disclosure relates generally to bonding clips, and more particularly to bonding clips used to bond metal roofs.

Description of the Related Art

Metal roofs are strong, fire-resistant and durable, and they now come with many finishes and in various styles which sometimes simulate the look of non-metal roofing materials such as tile or slate. As a result, metal roofs have in recent years become increasingly popular in commercial, residential, and other environments.

In recent years, the use of photovoltaic arrays to provide electrical power in commercial, residential, and other environments has also become popular. Photovoltaic arrays are typically composed of a number of photovoltaic modules set within a metallic frame, and a rail system that supports the photovoltaic modules. When installing a photovoltaic array, a number of photovoltaic modules are assembled onto the rail system. The metallic frames of the individual photovoltaic modules, and the structural pieces, e.g., the rails, on which the modules mount are generally made out of aluminum. Like other sources of electrical power, to ensure safety, the metal frames of the photovoltaic modules and the metal rails on which they are secured are often required by national or local electrical codes to be electrically bonded. Electrical bond and/or electrically bonded are used here in the technical sense to mean forming an electrically conductive path between the metal structures to ensure electrical continuity between the metal structures sufficient to safely conduct electrical current imposed on the metal structures.

As one may surmise, the increase in the use of metal roofing and the increased use of photovoltaic arrays to provide electrical power has led to the installation of the photovoltaic arrays on metal roofs, which in such situations may result in the need to electrically bond metal roofs where photovoltaic arrays are being installed.

SUMMARY

The present disclosure provides descriptions of embodiments for bonding clips used to electrically bond metal sheets forming metal roofs. In one exemplary embodiment, the bonding clip includes a pair of opposing arms, each having one end connected to a back pad and a free end such that a receiving zone is formed between the arms. Each arm has at least one penetrating projection extending into the receiving zone that is capable of penetrating non-conductive coatings on metal sheets forming metal roofs so that the penetrating projection contacts the metal of the sheets.

In another exemplary embodiment, the bonding clip includes a first arm, a second arm and a third arm each having one end connected to a back pad and a free end. The first and second arms oppose the third arm such that a receiving zone is formed between the arms. The bonding clip also includes a gap between the first and second arms that permits the bonding clip to straddle metal sheets of a metal roof. Each arm has at least one penetrating projection extending into the receiving zone that is capable of penetrating non-conductive coatings on metal sheets forming metal roofs so that the penetrating projection contacts the metal of the sheets.

In another exemplary embodiment, the bonding clip includes a first arm, a second arm and a third arm each having one end connected to a back pad and a free end. The first and second arms oppose the third arm such that a receiving zone is formed between the arms. The first and second arms have a gap between them that permits the bonding clip to straddle metal sheets of a metal roof. In this exemplary embodiment, the first and second arms are substantially flat, and each arm has at least one penetrating projection extending into the receiving zone.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figure 1:
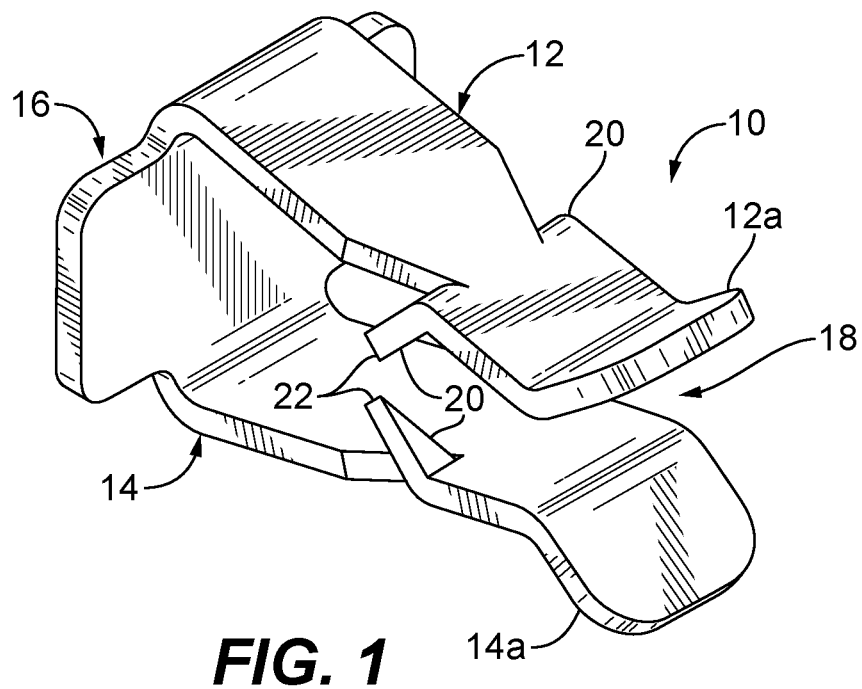
FIG. 1 is a front perspective view of an exemplary embodiment of a bonding clip according to the present disclosure.
Figure 2:
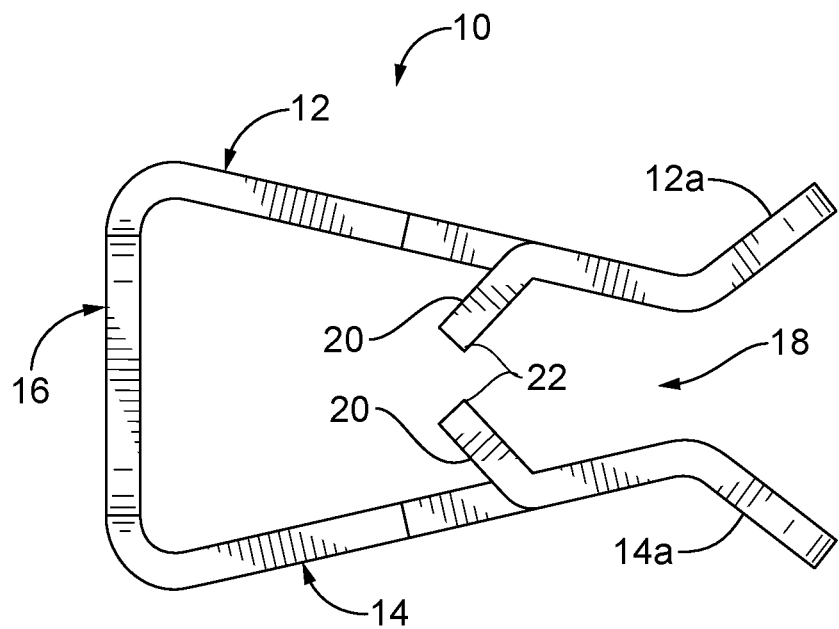
FIG. 2 is a side elevation view of the bonding clip of FIG. 1.

The present disclosure provides descriptions of embodiments for bonding clips used to electrically bond together metal sheets. The present disclosure also provides descriptions of embodiments for bonding clips used to electrically bond together sheets of metal roofing when installing photovoltaic arrays on metal roofing. The bonding clip is formed of metal, and can have a unitary or multi-part construction. The bonding clip bonds metal sheets of, for example, the metal roofing by using teeth-like projections that can penetrate protective coatings on the metal sheets to contact the metal in order to create an electrically conductive path between the metal sheets. This specification and the accompanying drawings are to be regarded in an illustrative sense rather than a restrictive sense. Various modifications may be made thereto without departing from the spirit and scope of the present disclosure.

Referring to FIGS. 1-5, an exemplary embodiment of a bonding clip according to the present disclosure is shown. In this exemplary embodiment, the bonding clip 10 may be of unitary construction and is formed into a clamp shape having two opposing arms 12 and 14, joined by a back pad 16. The two opposing arms 12 and 14 and back pad 16 define between them a receiving zone 18, e.g., an elongated channel, for receiving portions of metal sheets of, for example, a metal roof. Each arm 12 and 14 has a lead-in 12a and 14a, respectively, which may be a rounded edge or other lead-in that facilitates a easy entry of the bonding clip 10 onto metal sheets of a metal roof. Each arm 12 and 14 of the bonding clip 10 also has one or more penetrating projections 20, e.g. teeth, that extend into the receiving zone 18 so that a pointed end 22 of the penetrating projections 20 can pierce through non-conductive coatings, e.g., paint or powder coating, on metal sheets inserted between the arms 12 and 14 to contact the metal of the metal sheets. Having one or more penetrating projections 20 on each arm 12 and 14 ensures that each side of the bonding clip can engage a metal sheet to provide the electrical bonding function of the bonding clip, which is to create an electrically conductive path between the metal sheets.

Figure 3:
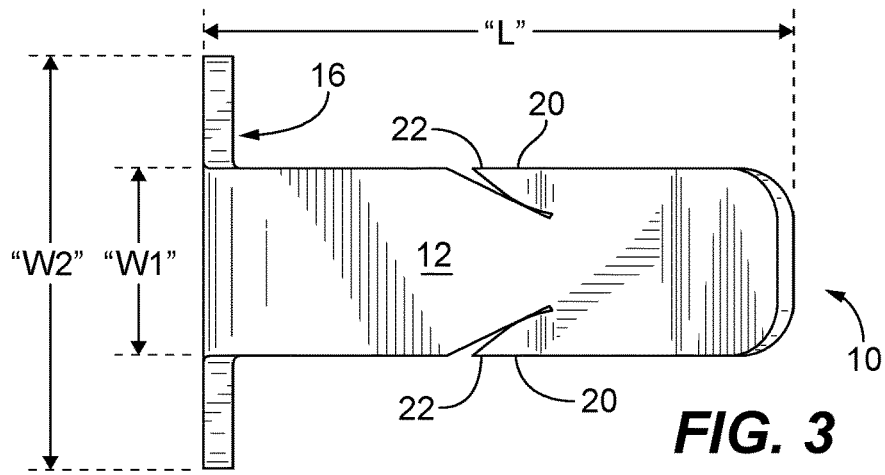
FIG. 3 is a top plan view of the bonding clip of FIG. 1.
Figure 4:
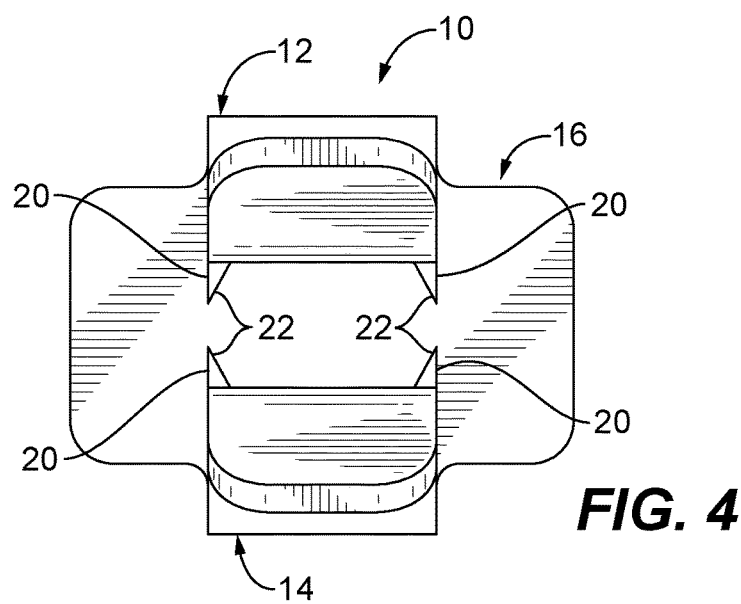
FIG. 4 is a front elevation view of the bonding clip of FIG. 1.
Figure 5:
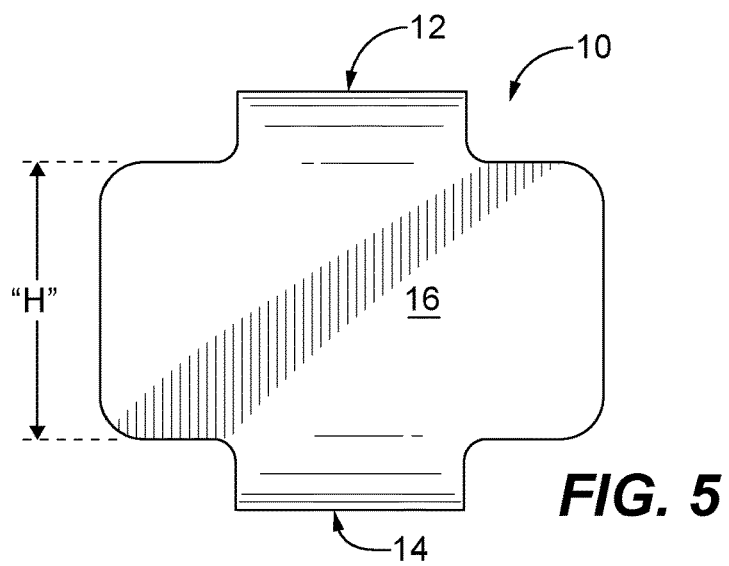
FIG. 5 is a rear elevation view of the bonding clip of FIG. 1.

The arms 12 and 14 can come in many shapes and sizes having a width "W1" and a length "L" as seen in FIG. 3. An example of the width "W1" of the arms can be in the range from about 5 mm to about 20 mm, and an example of the length "L" of the arms can be in the range from about 10 mm to about 30 mm. The back pad 16 can also come in many shapes and sizes, having a width "W2" and a height "H" as seen in FIGS. 3 and 5. In one example the back pad 16 may be an oversized back pad that provides a larger surface area to facilitate installation of the bonding clip 10 onto metal sheets of, for example, a metal roof. In such an example, the width "W2" of the back pad may be in the range from about 5 mm to about 20 mm, and the height "H" of the back pad may be in the range from about 5 mm to about 20 mm. In another example, the back pad 16 may be dimensioned to have the same width as the arms such that the width "W2" would be substantially equal to the width "W1".

The bonding clip 10 is made of a rigid, electrically conductive material. Examples of such a rigid, electrically conductive material is a conductive metal, such as steel, including stainless steel and galvanized steel, aluminum or aluminum alloy.

Figure 6:
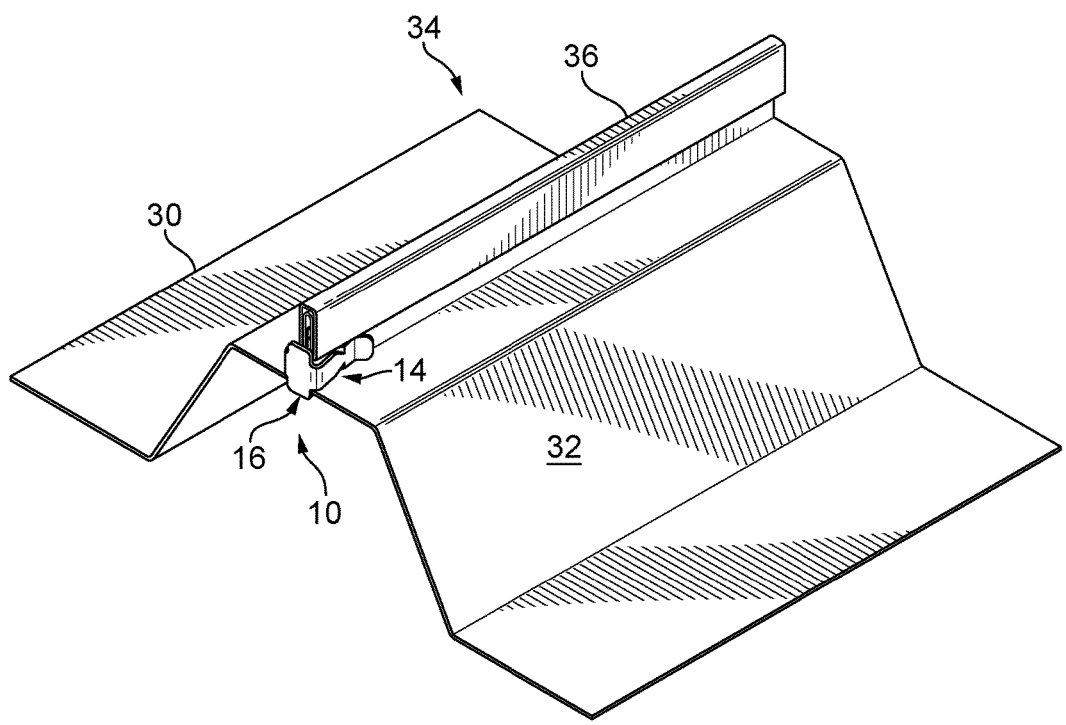
FIG. 6 is a top perspective view of a portion of a metal roof structure bonded using the bonding clip of FIG. 1.
Figure 7:
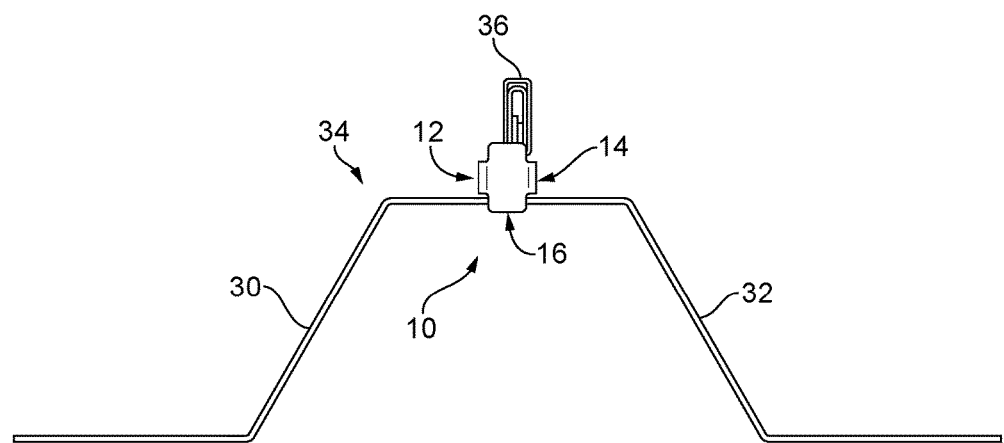
FIG. 7 is a side elevation view of the portion of a metal roof structure of FIG. 6.
Figure 8:
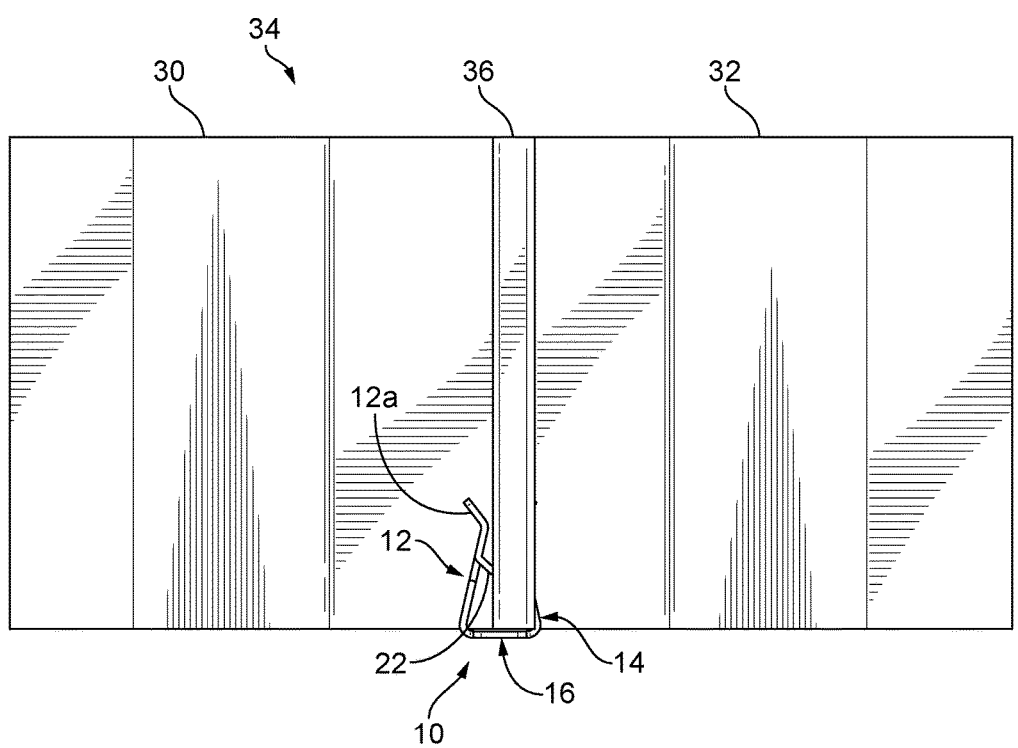
FIG. 8 is a top plan view of the portion of a metal roof structure of FIG. 6.
Figure 9:
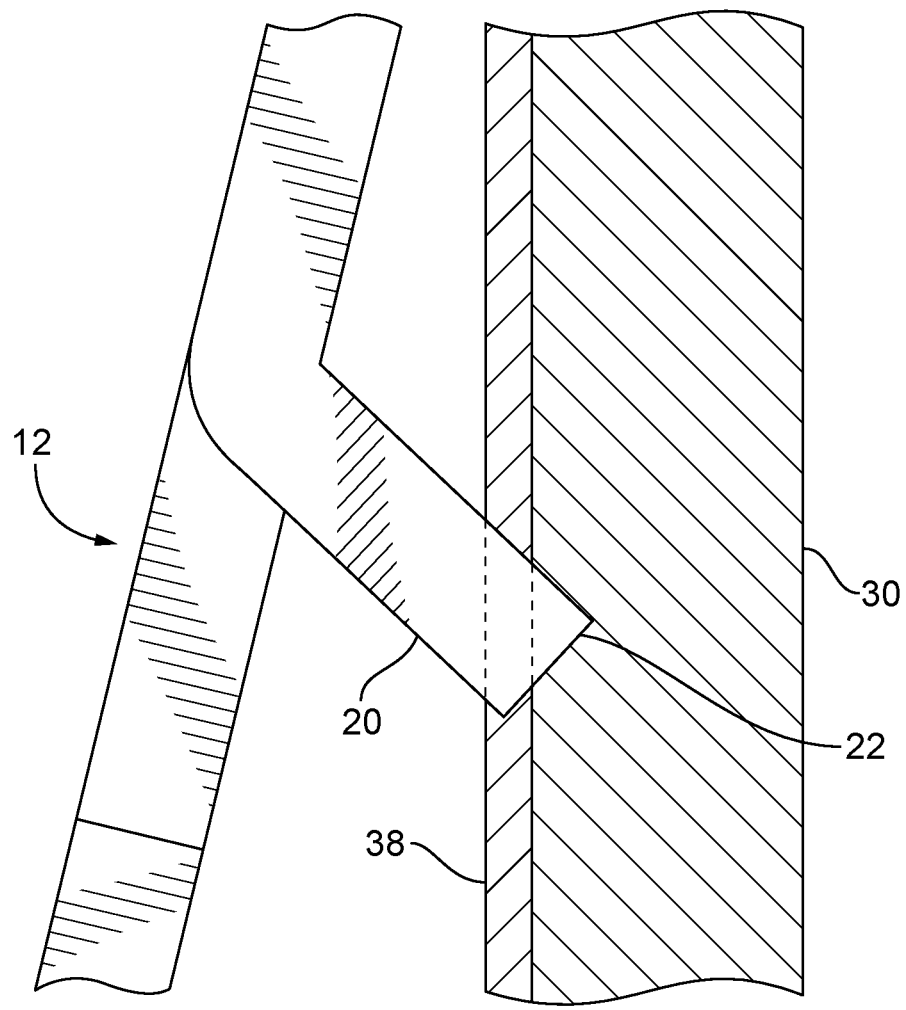
FIG. 9 is an enlarged view of a portion of FIG. 8 illustrating a penetrating projection piercing through a non-conductive coating on the metal roof structure.
Figure 10:
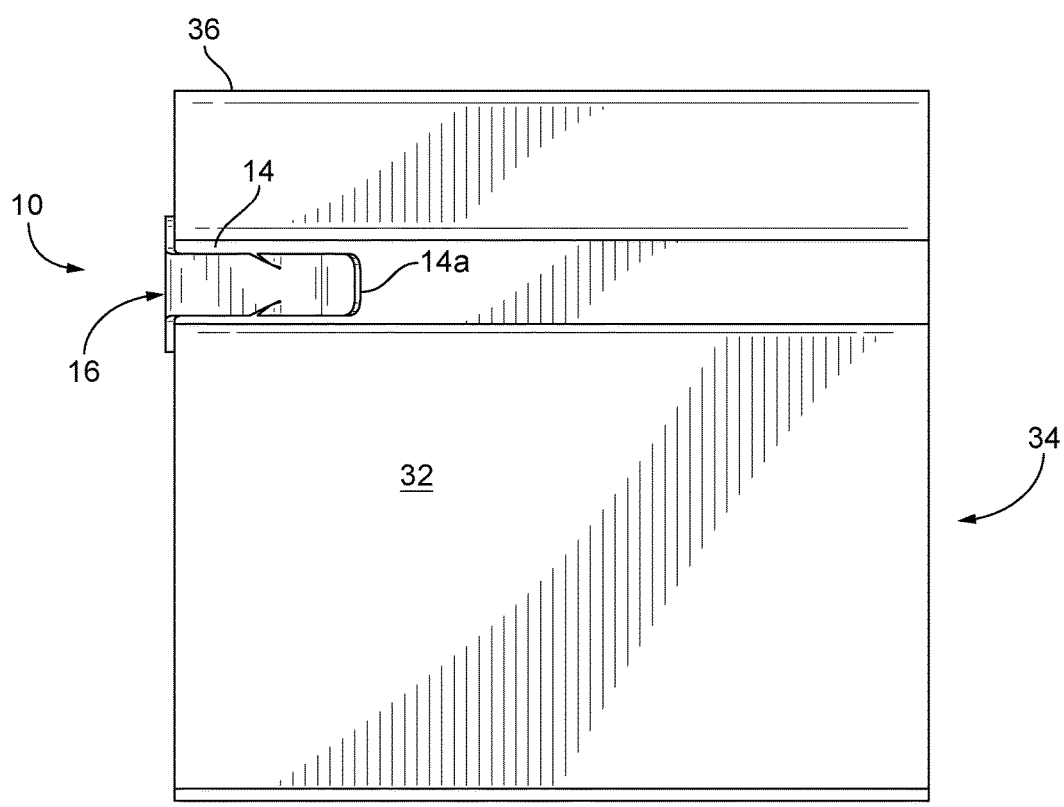
FIG. 10 is a side elevation view of the portion of a metal roof structure of FIG. 6.
Figure 11:
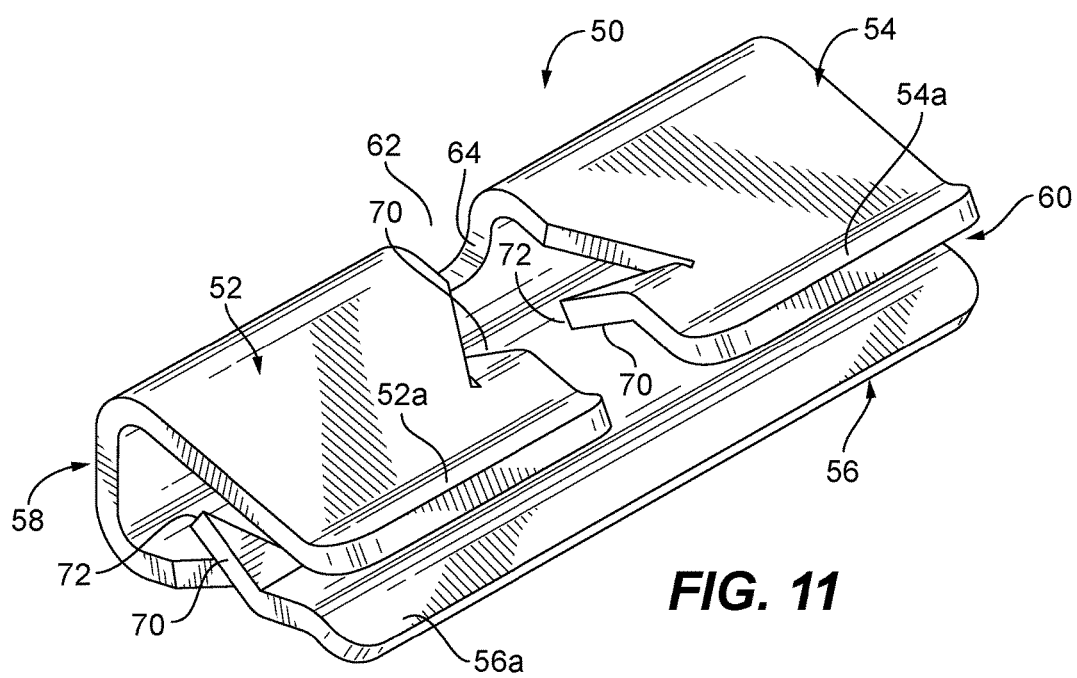
FIG. 11 is a front perspective view of another exemplary embodiment of a bonding clip according to the present disclosure.

Referring to FIGS. 6-10, in use, the lead-ins 12a and 14a of a bonding clip 10 are slipped over a seam, e.g., a raised or standing seam, between metal sheets 30 and 32 of, for example, a metal roof 34, or adjacent metal sheets of a metal roof, as seen in FIG. 6. The back pad 16 is then pushed toward the metal sheets, such that a portion of the metal sheets are received within the receiving zone 18 of the bonding clip 10, as seen in FIG. 8. As the bonding clip 10 is pushed onto the metal sheets 30 and 32, the pointed ends 22 of the penetrating projections 20 engage the respective metal sheet, and pierce through any non-conductive coatings 38 on the metal sheet so that at least the pointed ends 22 of the penetrating projections 20 contact the metal of the metal sheets, as seen in FIGS. 8 and 9. Once the bonding clip 10 is fully inserted onto the metal sheets, an electrical path is formed from one metal sheet 30 through the arm 12, via the one or more penetrating projections 20 extending from the arm 12 into the receiving zone 18, through the back pad 16, through the arm 14 to the metal sheet 32, via the one or more penetrating projections 20 extending from the arm 14 into the receiving zone 18.

Figure 14:
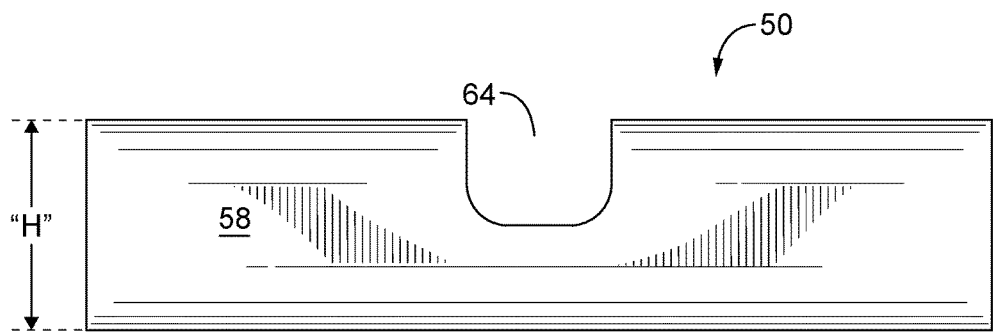
FIG. 14 is a rear elevation view of the bonding clip of FIG. 11.
Figure 15:
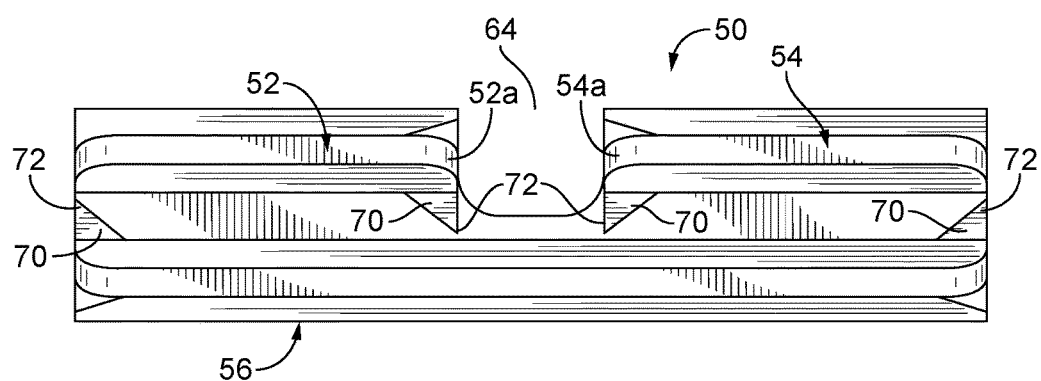
FIG. 15 is a front elevation view of the bonding clip of FIG. 11.
Figure 16:
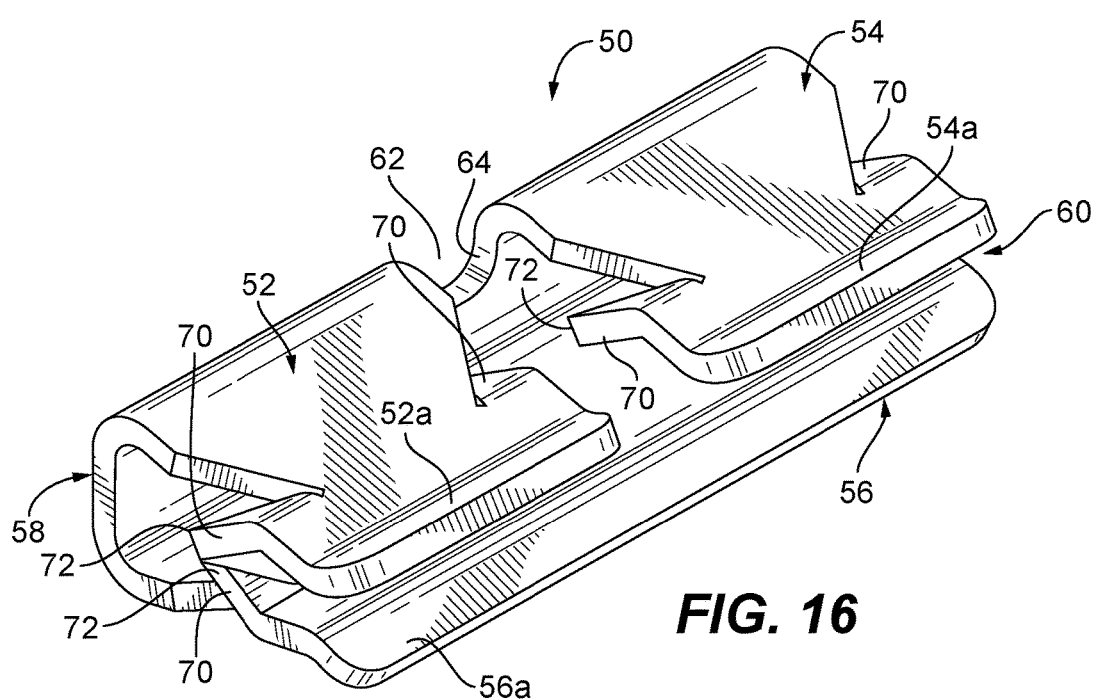
FIG. 16 is a front perspective view of another exemplary embodiment of a bonding clip according to the present disclosure.

Referring now to FIGS. 11-15, another exemplary embodiment of a bonding clip according to the present disclosure is shown. In this exemplary embodiment, the bonding clip 50 may be of unitary construction and is formed into a clamp shape having arms 52, 54 and 56, joined by a back pad 58 such that arms 52 and 54 oppose arm 56. The arms 52, 54 and 56, and the back pad 58 define between them a receiving zone 60, e.g., an elongated channel, for receiving portions of metal sheets of, for example, a metal roof. Arms 52 and 54 are joined to the same side of back pad 58 with a gap 62 between the arms 52 and 54. The width of the gap should be larger than the thickness of any seam between the metal sheets to which the bonding clip is to be attached. In the area of the gap 62 between the arms 52 and 54 there may be a notch 64 in the back pad 58 as seen in FIGS. 14 and 15. The gap 62 and notch 64, if included, permit the bonding clip 50 to straddle across metal sheets of, for example, a metal roof, as described in more detail below. Each arm 52, 54 and 56 has a lead-in 52a, 54a and 56a, respectively, which may be a rounded edge or other lead-in that facilitates easy entry of the bonding clip 50 onto metal sheets of, for example, a metal roof. Each arm 52, 54 and 56 of the bonding clip 50 also has one or more penetrating projections 70, e.g. teeth, that extend into the receiving zone 60. Each penetrating projection 70 has a pointed end 72 that can pierce through non-conductive coatings, e.g., paint or powder coating, on metal sheets inserted between the arms 52 and 56 and between arms 54 and 56, to contact the metal of the metal sheets. Having one or more penetrating projections 70 on each arm 52, 54 and 56 ensures that each side of the bonding clip can engage a metal sheet to provide the electrical bonding function of the bonding clip, which is to create an electrically conductive path between the metal sheets. In the embodiment shown in FIG. 16, the arms 52 and 54 in bonding clip 50 have two penetrating projections 70.

Figure 12:
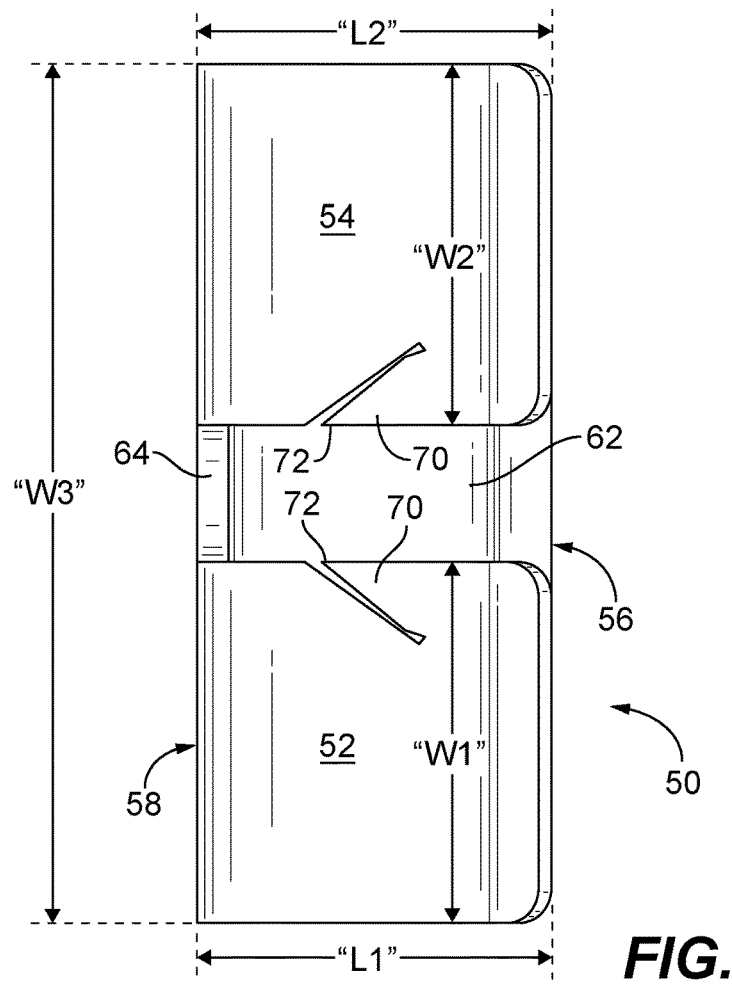
FIG. 12 is a top plan view of the bonding clip of FIG. 11.
Figure 13:
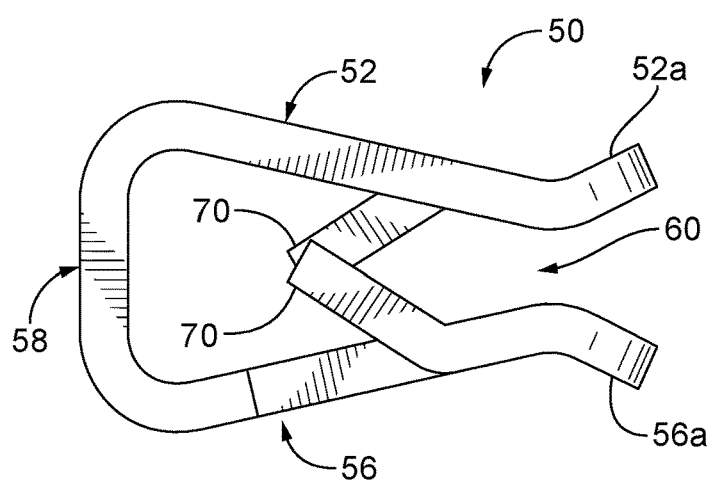
FIG. 13 is a side elevation view of the bonding clip of FIG. 11.

Continuing to refer to FIGS. 11-15, the arm 52 can come in many shapes and sizes having a width "W1" and a length "L1" as seen in FIG. 12. An example of the width "W1" of the arm 52 can be in the range from about 5 mm to about 30 mm, and an example of the length "L1" of the arm 52 can be in the range from about 5 mm to about 20 mm. The arm 54 can come in many shapes and sizes having a width "W2" and a length "L2" as seen in FIG. 12. An example of the width "W2" of the arm 54 can be in the range from about 5 mm to about 30 mm, and an example of the length "L2" of the arm 54 can be in the range from about 5 mm to about 20 mm. Is should be noted that the shape and size of the arms 52 and 54 may be the same or they may differ. Arm 56 can come in many shapes and sizes having a width "W3" and a length that is similar to the lengths "L1" and/or "L2". An example of the width "W3" of the arm 56 can be in the range from about 12 mm to about 70 mm. The back pad 58 can also come in many shapes and sizes, having a width that is substantially the same as the width of the arm 56 and a height "H" seen in FIG. 14, or the width of the back pad 58 may be oversized so that the back pad provides a larger surface area to facilitate installation of the bonding clip 50 onto metal sheets of a metal roof. In such an example, the width of the back pad may be in the range from about 12 mm to about 70 mm, and the height "H" of the back pad may be in the range from about 5 mm to about 20 mm.

The bonding clip 50 is made of a rigid, electrically conductive material. Examples of such a rigid, electrically conductive material is a conductive metal, such as steel, including stainless steel and galvanized steel, aluminum or aluminum alloy.

Figure 17:
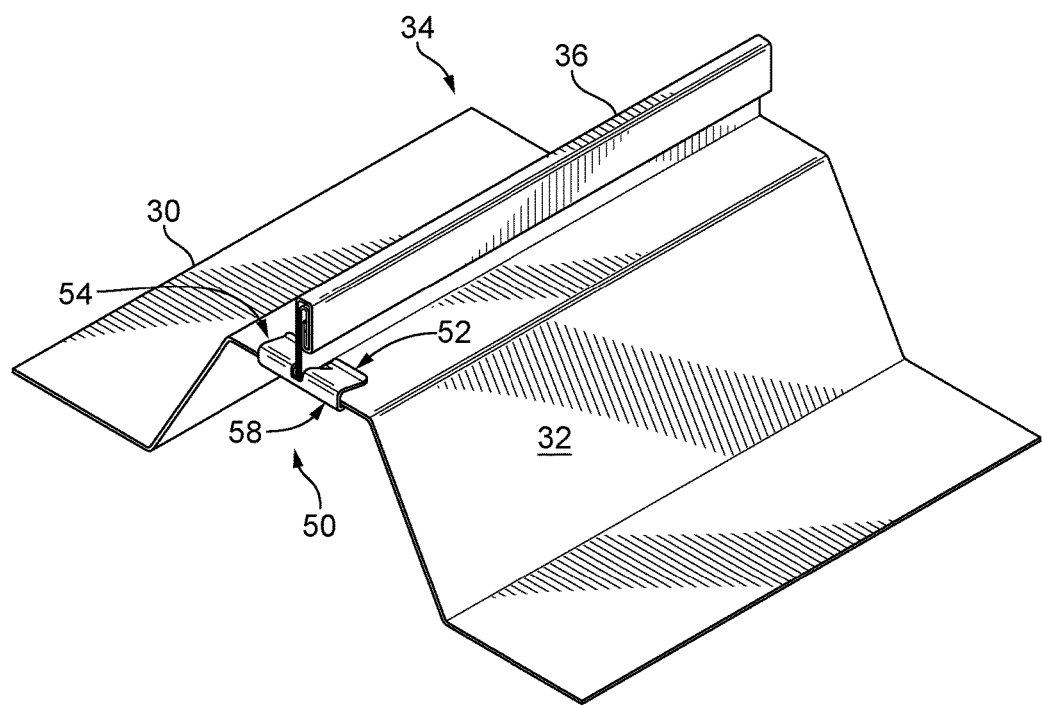
FIG. 17 is a top perspective view of a portion of a metal roof structure bonded using the bonding clip of FIG. 11.
Figure 18:
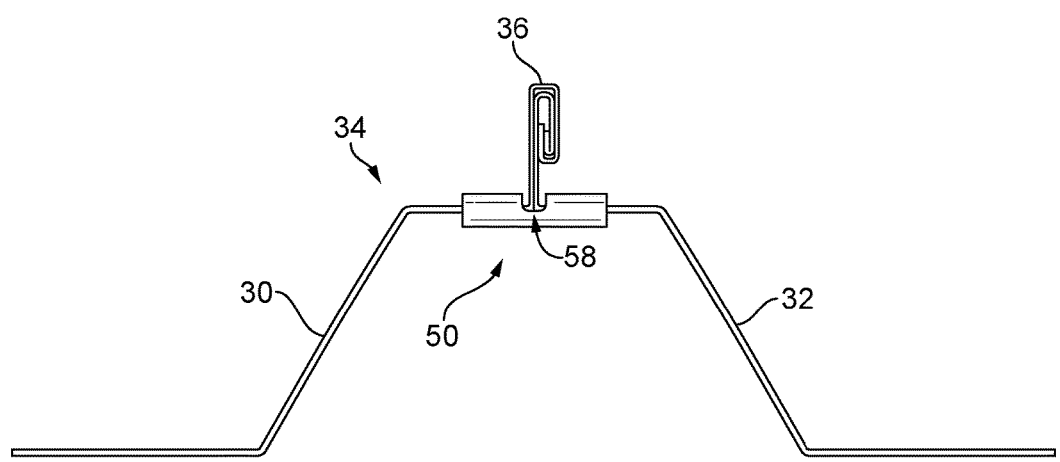
FIG. 18 is a side elevation view of the portion of a metal roof structure of FIG. 17.
Figure 19:
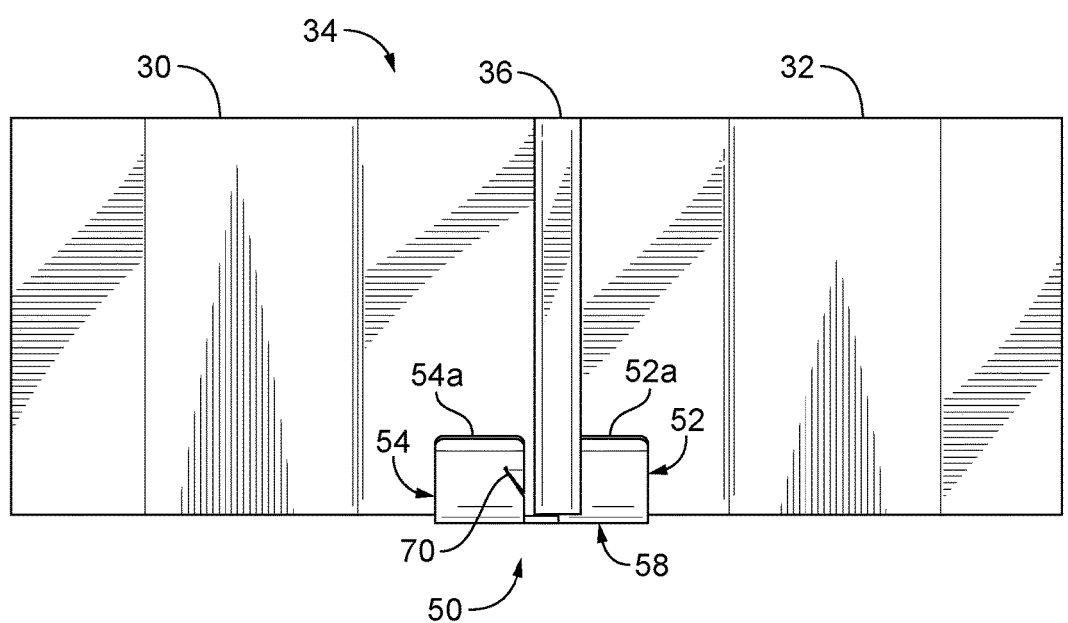
FIG. 19 is a top plan view of the portion of a metal roof structure of FIG. 17.
Figure 20:
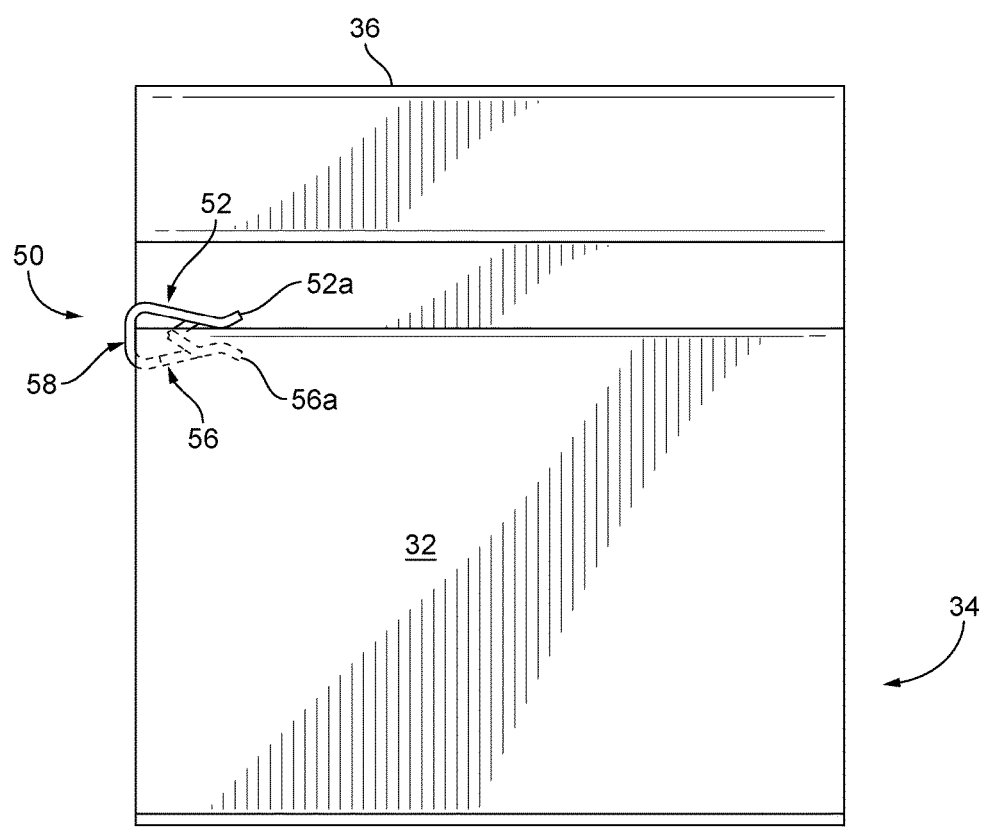
FIG. 20 is a side elevation view of the portion of a metal roof structure of FIG. 17.
Figure 21:
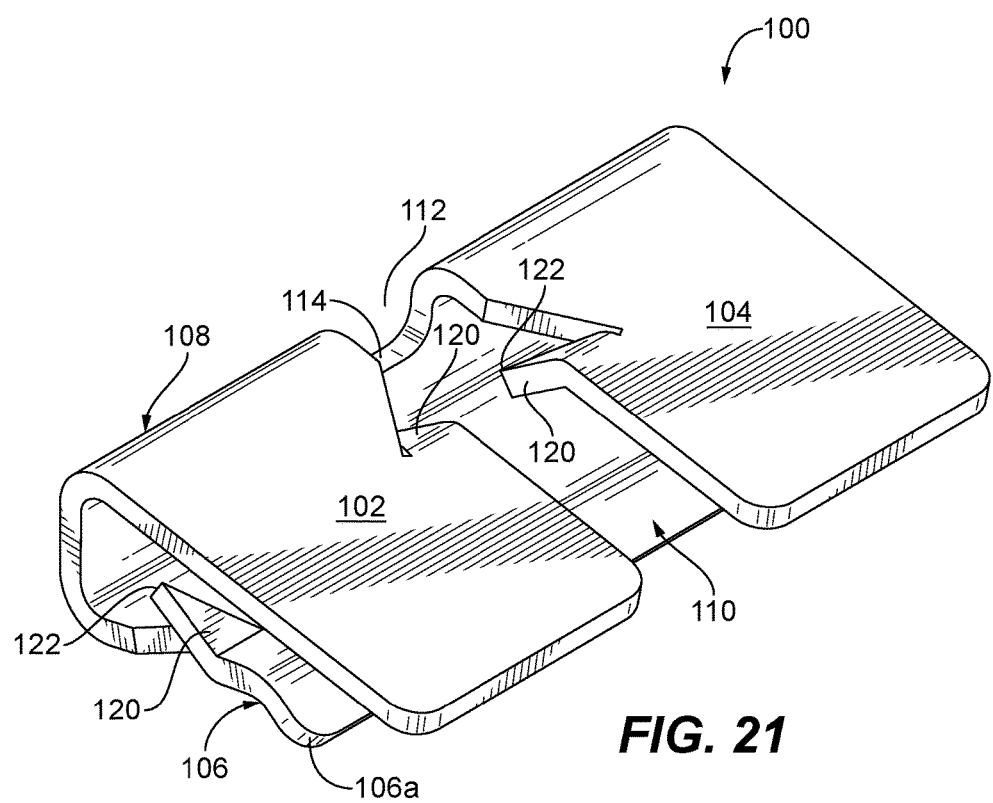
FIG. 21 is a front perspective view of another exemplary embodiment of a bonding clip according to the present disclosure.

Referring to FIGS. 17-20, in use, the lead-ins 52a, 54a and 56a of a bonding clip 50 are slipped across a seam, e.g., a raised or standing seam, between metal sheets 30 and 32 of, for example a metal roof 34, or adjacent metal sheets of, for example a metal roof, so that the bonding clip 50 straddles the seam, as seen in FIG. 17. The back pad 58 is then pushed toward the metal sheets such that a portion of the metal sheets are received within the receiving zone 60 of the bonding clip 50, as seen in FIGS. 17, 19 and 20. As the bonding clip 50 is pushed onto the metal sheets 30 and 32, the pointed ends 72 of the penetrating projections 70 engage the respective metal sheet and pierce through any coatings on the metal sheet so that at least the pointed ends 72 of the penetrating projections 70 contact the metal of the metal sheets, similar to that shown in FIG. 9. Once the bonding clip 50 is fully inserted onto the metal sheets an electrical path is formed from one metal sheet 30 through the arm 54, via the one or more penetrating projections 70 extending from the arm 54 into the receiving zone 60, through the back pad 58, through the arm 52 to the metal sheet 32, via the one or more penetrating projections 70 extending from the arm 52 into the receiving zone 60. In addition, an electrical path is formed from one metal sheet 30 through the arm 56, via the one or more penetrating projections 70 extending from the arm 56 into the receiving zone 60, through the arm 56 to the metal sheet 32, via the one or more penetrating projections 70 extending from the arm 56 into the receiving zone 60.

Figure 22:
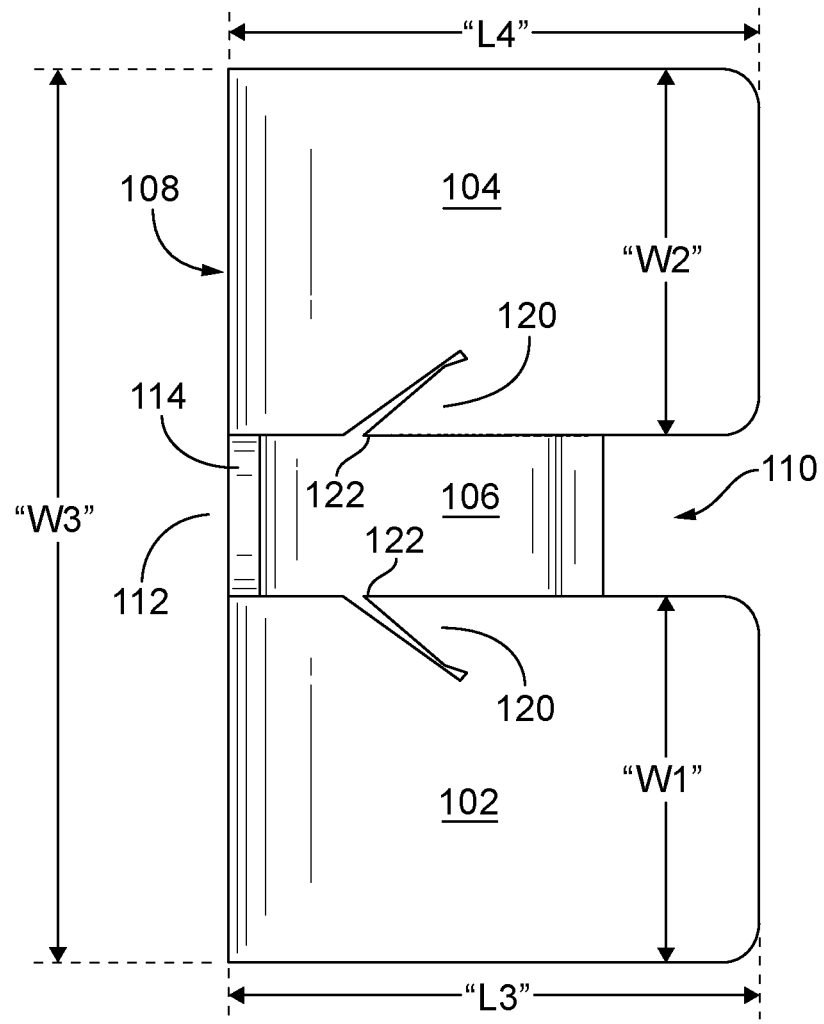
FIG. 22 is a top plan view of the bonding clip of FIG. 21.
Figure 23:
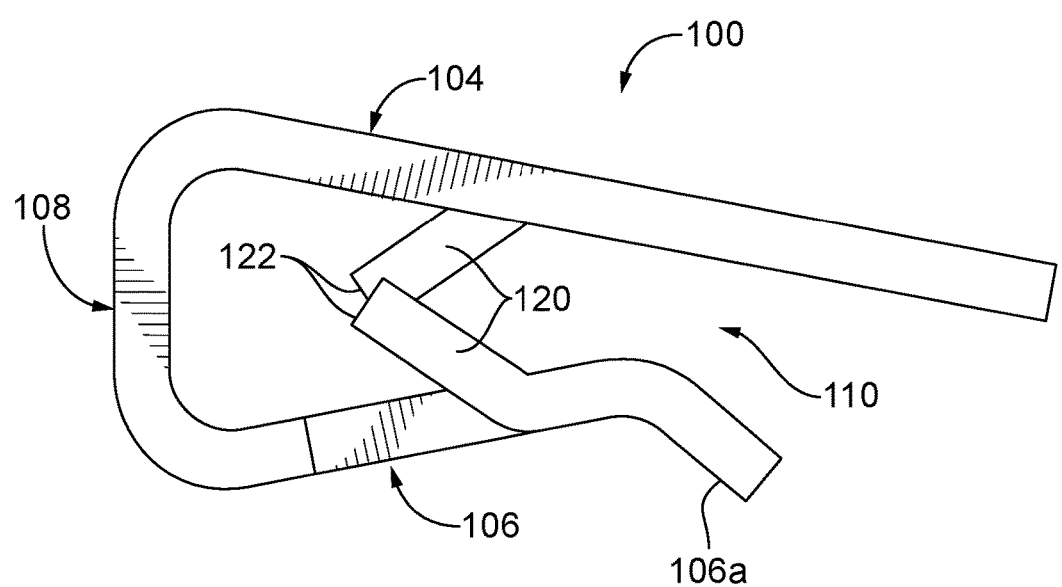
FIG. 23 is a side elevation view of the bonding clip of FIG. 21.
Figure 24:
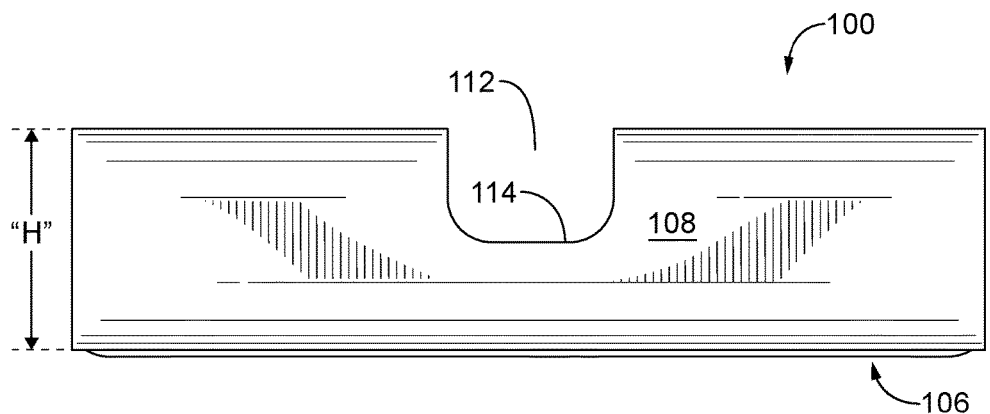
FIG. 24 is a rear elevation view of the bonding clip of FIG. 21.
Figure 25:
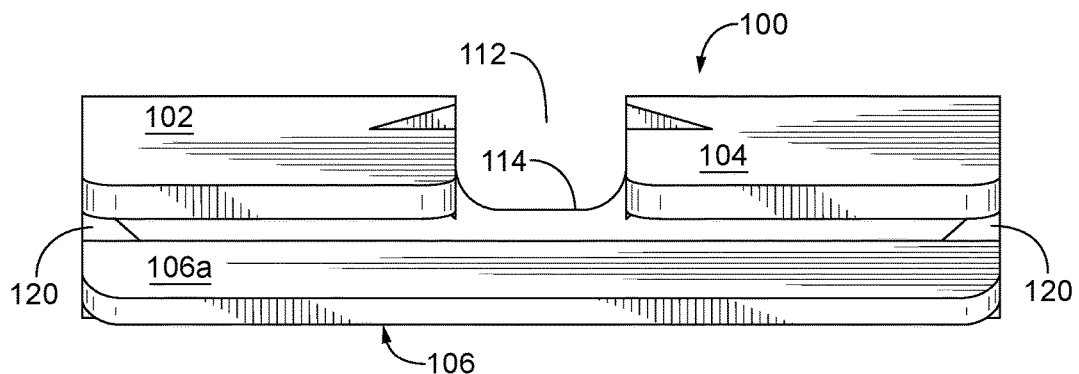
FIG. 25 is a front elevation view of the bonding clip of FIG. 21.

Referring now to FIGS. 21-25, another exemplary embodiment of a bonding clip according to the present disclosure is shown. In this exemplary embodiment, the bonding clip 100 may be of unitary construction and is formed into a clamp shape having arms 102, 104 and 106, joined by a back pad 108 such that arms 102 and 104 oppose arm 106. The arms 102, 104 and 106, and the back pad 108 define between them a receiving zone 110, e.g., an elongated channel, for receiving portions of metal sheets of, for example, a metal roof. Arms 102 and 104 are joined to the same side of back pad 108 with a gap 112 between the arms 102 and 104. The width of the gap should be larger than the thickness of any seam between the metal sheets to which the bonding clip is to be attached. In the area of the gap 112 between the arms 102 and 104 there may be a notch 114 in the back pad 108, as seen in FIGS. 24 and 25. The gap 112 and notch 114, if included, permit the bonding clip 100 to straddle across metal sheets of, for example, a metal roof, as described in more detail below. In this embodiment, each arm 102 and 104 does not include a lead-in such that the arm is substantially straight or flat to reduce the surface area of the bonding clip 100 that can be impacted by ice, snow and/or other debris to limit inadvertent detachment of the bonding clip from one or more metal sheets of, for example, a metal roof. The arm 102 can come in many shapes and sizes having a width "W1" and a length "L3" as seen in FIG. 22. An example of the width "W1" of the arm 102 can be in the range from about 5 mm to about 30 mm. An example of the length "L3" of the arm 102 can be in the range from about 10 mm to about 80 mm. The arm 104 can come in many shapes and sizes having a width "W2" and a length "L4" as seen in FIG. 22. An example of the width "W2" of the arm 104 can be in the range from about 5 mm to about 30 mm. An example of the length "L4" of the arm 104 can be in the range from about 10 mm to about 80 mm. It should be noted that the shape and size of the arms 102 and 104 may be the same or they may differ. It should also be noted that in this embodiment the length of the arms 102 and 104 are preferably longer than the length of the arm 106, as seen in FIG. 23.

As shown in FIGS. 22, 23 and 25, arm 106 has a lead-in 106a, which may be a rounded edge or other lead-in, that along with the longer arm lengths of arms 102 and 104 facilitate easy entry of the bonding clip 100 onto metal sheets of, for example, a metal roof. Arm 106 can come in many shapes and sizes having a width "W3" and a length that is less that the lengths "L3" and/or "L4". An example of the width "W3" of the arm 106 can be in the range from about 12 mm to about 70 mm. The back pad 108 can also come in many shapes and sizes, having a width that is substantially the same as the width of the arm 106 and a height "H" as seen in FIG. 24, or the width of the back pad 108 may be oversized so that the back pad provides a larger surface area to facilitate installation of the bonding clip 100 onto metal sheets of a metal roof. In such an example, the width of the back pad may be in the range from about 12 mm to about 70 mm, and the height "H" of the back pad may be in the range from about 5 mm to about 20 mm.

Each arm 102, 104 and 106 of the bonding clip 100 also has one or more penetrating projections 120, e.g. teeth, that extend into the receiving zone 110. Each penetrating projection 120 has a pointed end 122 that can pierce through non-conductive coatings, e.g., paint or powder coating, on metal sheets inserted between the arms 102 and 106, and between arms 104 and 106, and contact the metal of the metal sheets. Having one or more penetrating projections 120 on each arm 102, 104 and 106 ensures that each side of the bonding clip can engage a metal sheet to provide the electrical bonding function of the bonding clip, which is to create an electrically conductive path between the metal sheets.

The bonding clip 100 is made of a rigid, electrically conductive material. Examples of such a rigid, electrically conductive material is a conductive metal, such as steel, including stainless steel and galvanized steel, aluminum or aluminum alloy.

Figure 26:
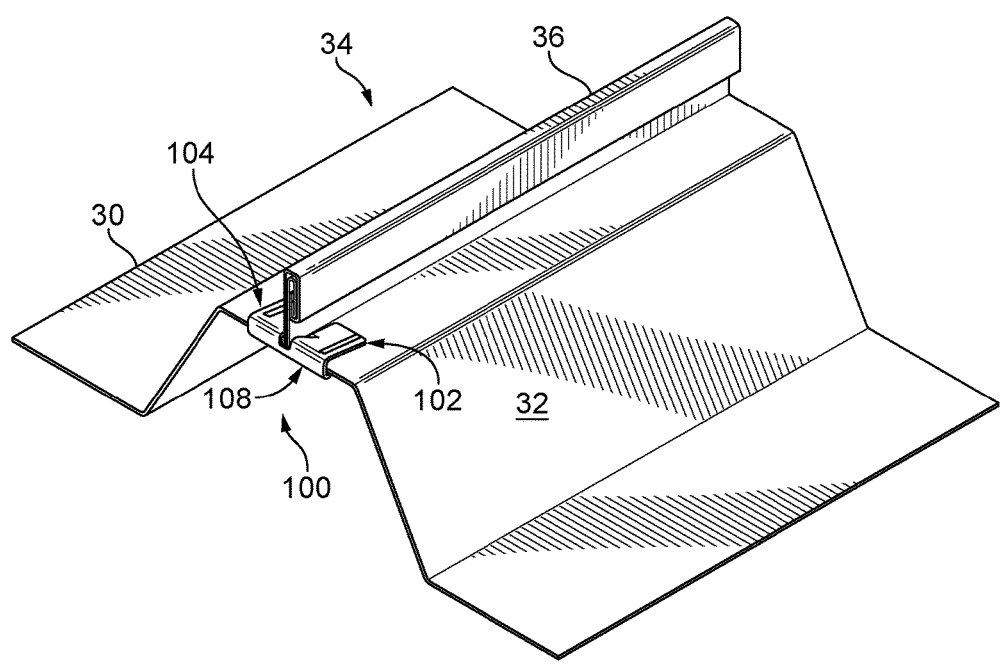
FIG. 26 is a top perspective view of a portion of a metal roof structure bonded using the bonding clip of FIG. 21.
Figure 27:
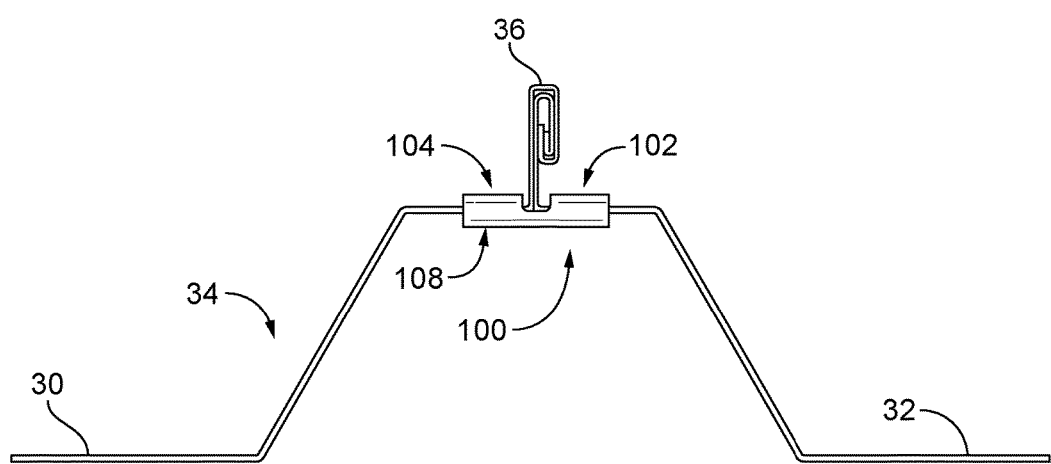
FIG. 27 is a side elevation view of the portion of a metal roof structure of FIG. 26.
Figure 28:
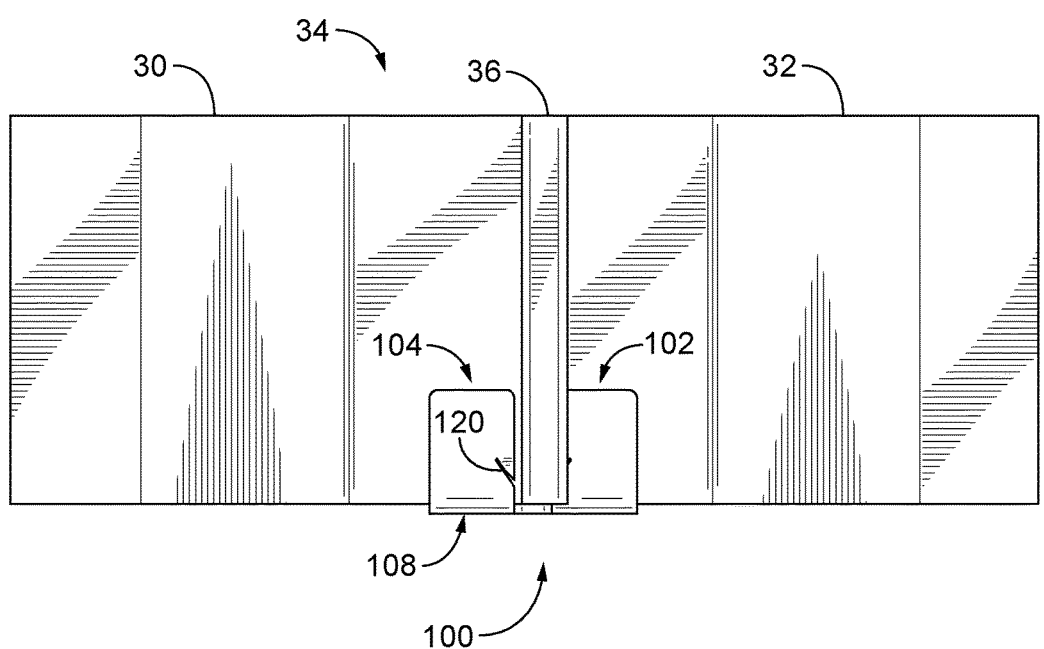
FIG. 28 is a top plan view of the portion of a metal roof structure of FIG. 26.
Figure 29:
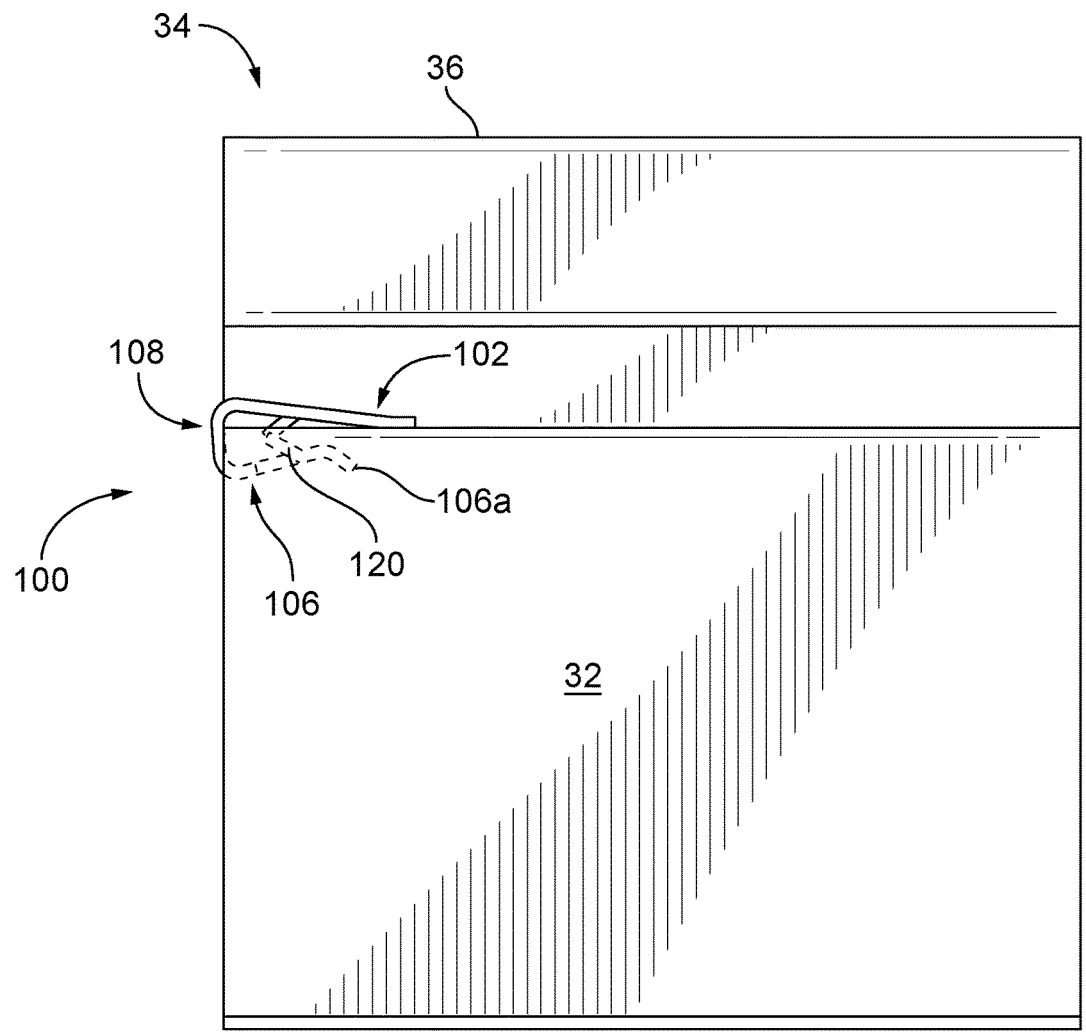
FIG. 29 is a side elevation view of the portion of a metal roof structure of FIG. 26.
Figure 30:
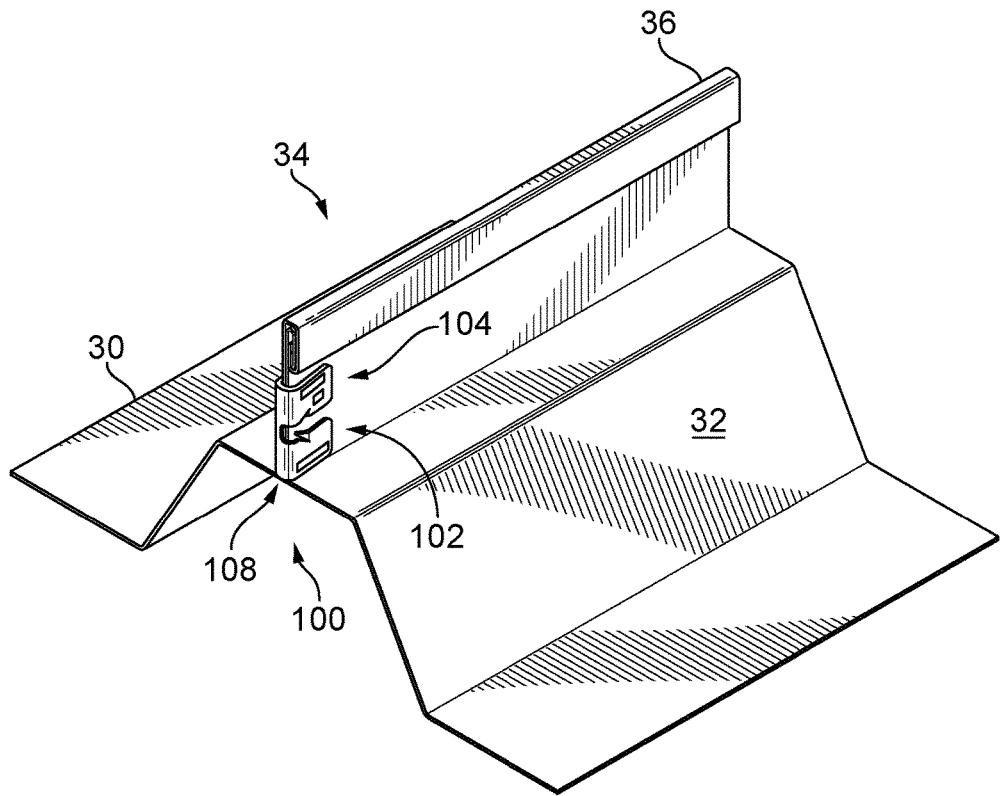
FIG. 30 is a top perspective view of a portion of a metal roof structure bonded using the bonding clip of FIG. 21.
Figure 31:
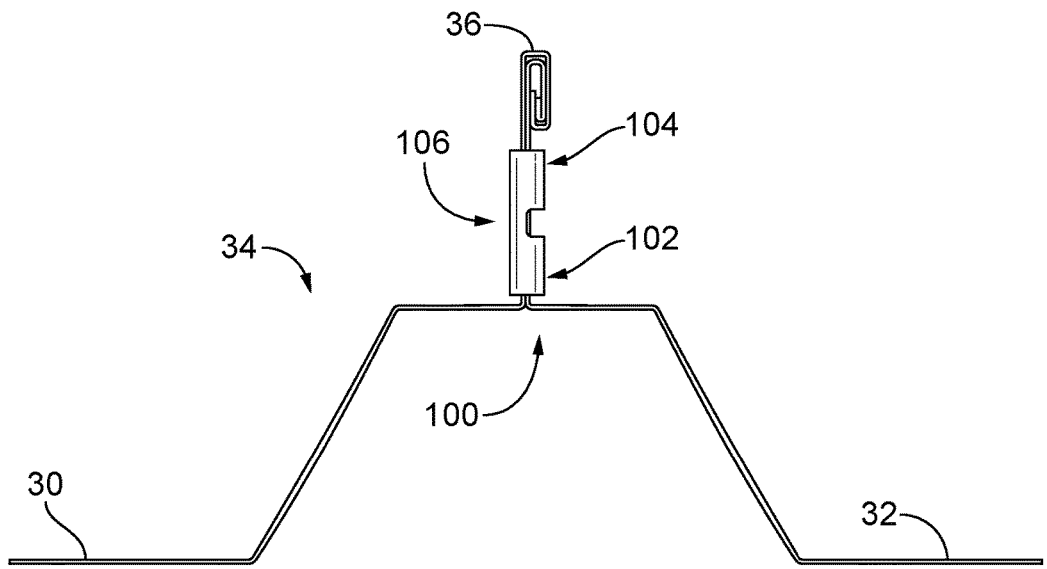
FIG. 31 is a side elevation view of the portion of a metal roof structure of FIG. 30.

Referring to FIGS. 26-29, in use, the arms 102 and 104 of a bonding clip 100 are slipped onto a seam, e.g., a raised or standing seam, between metal sheets 30 and 32 of, for example a metal roof 34, or adjacent metal sheets of, for example a metal roof, so that the bonding clip 100 straddles the seam, as seen in FIGS. 26 and 27. The back pad 108 is then pushed toward the metal sheets, such that the lead-in 106a of arm 106 contacts the metal sheets, as seen in FIG. 29. The arms 102 and 104 combined with the lead-in 106a guide the bonding clip 100 onto the metal sheets 30 and 32. Continued pressure or tapping with, for example, a mallet on the back pad 108 causes a portion of the metal sheets to be received within the receiving zone 110 of the bonding clip 100, as seen in FIGS. 28 and 29. As the bonding clip 100 is pushed or tapped onto the metal sheets 30 and 32, the pointed ends 122 of the penetrating projections 120 engage the respective metal sheet and pierce through any coatings on the metal sheet so that at least the pointed ends 122 of the penetrating projections 120 contact the metal of the metal sheets, similar to that shown in FIG. 9. Once the bonding clip 100 is fully inserted onto the metal sheets, an electrical path is formed from one metal sheet 30 through the arm 104, via the one or more penetrating projections 120 extending from the arm 104 into the receiving zone 110, through the back pad 108, through the arm 102 to the metal sheet 32, via the one or more penetrating projections 120 extending from arm 102 into the receiving zone 110. In addition, an electrical path is formed from one metal sheet 30 through the arm 106, via the one or more penetrating projections 120 extending from arm 106 into the receiving zone 110, through the arm 106 to the metal sheet 32, via the one or more penetrating projections 120 extending from arm 106 into the receiving zone 110. In the embodiment of FIGS. 26-29, the bonding clip 100 is installed horizontally. In instances where the seam between metal sheets is a raised seam, as seen in FIGS. 30 and 31, the bonding clip 100 may be installed vertically.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A bonding clip for metal roofing comprising:
   a substantially flat backpad having a first side with a first predetermined width and a second side with the first predetermined width spaced from the first side;
   a plurality of first arms, each of the plurality of first arms having a second predetermined width that is less than the first predetermined width, wherein each of the plurality of first arms includes a first end connected to the first side of the back pad and a second end spaced from the back pad;
   a second arm having the first predetermined width, the second arm including a first end connected to the second side of the back pad such that an inner surface of the plurality of first arms opposes an inner surface of the second arm, and a second end spaced from the back pad;
   a receiving zone formed between the plurality of first arms, the second arm and the back pad; and
   wherein the each of the plurality of first arms has at least one penetrating projection extending into the receiving zone and the second arm has at least one penetrating projection extending into the receiving zone.

2. The bonding clip according to claim 1, wherein each at least one penetrating projection comprises a tooth having a pointed end.

3. The bonding clip according to claim 1, wherein each at least one penetrating projection comprises a plurality of penetrating projections.

4. The bonding clip according to claim 3, wherein each of the plurality of penetrating projection comprises a tooth having a pointed end.

5. The bonding clip according to claim 1, wherein the first arm includes a lead-in at the second end of the first arm, and wherein the second arm includes a lead-in at the second end of the second arm.

6. The bonding clip according to claim 1, wherein the back pad is an oversized back pad.

7. A bonding clip for metal roofing comprising:
   a first arm having a first end connected directly to a first side of a back pad and a second end spaced from the back pad;
   a second arm having a first end connected directly to the first side of the back pad and a second end spaced from the back pad;
   a third arm having a first end connected to a second side of the back pad and a second end spaced from the back pad, wherein an inner surface of the first and second arms oppose an inner surface of the third arm;
   a first receiving zone formed between the first arm, the second arm, the third arm and the back pad;
   at least one first penetrating projection extending from the first arm into the first receiving zone;
   at least one second penetrating projection extending from the second arm into the first receiving zone;
   at least one third penetrating projection extending from the third arm into the first receiving zone; and
   a gap between the first and second arms such that a second receiving zone is formed between the first and second arms, the second receiving zone being configured to receive metal sheets so as to permit the bonding clip to straddle metal sheets of a metal roof.

8. The bonding clip according to claim 7, wherein the at least one first penetrating projection, the at least one second penetrating projection and the at least one third penetrating projection comprises a tooth having a pointed end.

9. The bonding clip according to claim 7, wherein the at least one first penetrating projection, the at least one second penetrating projection and the at least one third penetrating projection comprises a plurality of penetrating projections.

10. The bonding clip according to claim 9, wherein each of the plurality of penetrating projection comprises a tooth having a pointed end.

11. The bonding clip according to claim 7, wherein each arm has a lead-in at the free end.

12. The bonding clip according to claim 7, wherein the back pad is an oversized back pad.

13. A bonding clip for metal roofing comprising
a substantially flat first arm having a first end connected directly to a first side of a back pad and a second end spaced from the back pad;
a substantially flat second arm having a first end connected directly to the first side of a back pad and a second end spaced from the back pad;
a third arm having a first end connected to a second side of the back pad and a second end spaced from the back pad, wherein an inner surface of the first and second arms oppose an inner surface of the third arm;
a first receiving zone formed between the first arm, the second arm, the third arm and the back pad;
at least one first penetrating projection extending from the first arm into the first receiving zone;
at least one second penetrating projection extending from the second arm into the first receiving zone;
at least one third penetrating projection extending from the third arm into the first receiving zone; and
a gap between the first and second arms such that a second receiving zone is formed between the first and second arms, the second receiving zone being configured to receive metal sheets so as to permit the bonding clip to straddle metal sheets of a metal roof.

14. The bonding clip according to claim 13, wherein the at least one first penetrating projection, the at least one second penetrating projection and the at least one third penetrating projection comprises a tooth having a pointed end.

15. The bonding clip according to claim 13, wherein the at least one first penetrating projection, the at least one second penetrating projection and the at least one third penetrating projection comprises a plurality of penetrating projections.

16. The bonding clip according to claim 15, wherein each of the plurality of penetrating projection comprises a tooth having a pointed end.

17. The bonding clip according to claim 13, wherein the third arm has a lead-in at the free end.

* * * * *